(12) United States Patent
Kelleter

(10) Patent No.: US 11,762,401 B2
(45) Date of Patent: Sep. 19, 2023

(54) FLOATING SOLAR POWERED LIQUID COOLING DEVICE

(71) Applicant: Kaitlyn Kelleter, Bangor, ME (US)

(72) Inventor: Kaitlyn Kelleter, Bangor, ME (US)

( * ) Notice: Subject to any disclaimer, the term of this patent is extended or adjusted under 35 U.S.C. 154(b) by 133 days.

(21) Appl. No.: 17/474,229

(22) Filed: Sep. 14, 2021

(65) Prior Publication Data

US 2023/0081367 A1    Mar. 16, 2023

(51) Int. Cl.
*G05D 23/19* (2006.01)
*H02S 10/40* (2014.01)
*A01G 33/00* (2006.01)

(52) U.S. Cl.
CPC ............. *G05D 23/19* (2013.01); *A01G 33/00* (2013.01); *H02S 10/40* (2014.12)

(58) Field of Classification Search
CPC ........ G05D 23/19; A01G 33/00; H02S 10/40; F24S 10/17; F24S 20/70; F28F 2025/005; F24F 5/0046; F24F 2005/0064; F24F 2005/0067
See application file for complete search history.

(56) References Cited

U.S. PATENT DOCUMENTS

| | | | | |
|---|---|---|---|---|
| 4,284,060 A * | 8/1981 | McCluskey | ............. | F24S 10/17 126/565 |
| 4,906,359 A * | 3/1990 | Cox, Jr. | ............. | F24S 20/70 261/120 |
| 7,793,652 B1 * | 9/2010 | Delgado | ............. | F24S 20/02 126/561 |
| 8,458,952 B1 * | 6/2013 | Davies | ............. | C12M 41/00 424/195.17 |
| 2008/0277492 A1 | 11/2008 | Cannon | | |
| 2009/0113790 A1 * | 5/2009 | Erd | ............. | A01G 33/00 165/123 |

(Continued)

FOREIGN PATENT DOCUMENTS

CN            103229653 A       8/2013

OTHER PUBLICATIONS

"Kelp Forests", National Park Service, Updated: Feb. 14, 2018, Retrieved from the Internet on Sep. 13, 2021; 4 pages.

(Continued)

*Primary Examiner* — Nelson J Nieves
*Assistant Examiner* — Matthew John Moscola
(74) *Attorney, Agent, or Firm* — CANTOR COLBURN LLP

(57) ABSTRACT

A device that can float in a liquid can be used to adjust the temperature of the liquid by monitoring the temperature of the liquid and comparing to a desired temperature and pumping liquid into contact with a thermal adjustment element in the device. The device comprises a thermal adjustment element, a temperature detector to measure the temperature of the liquid exterior to the device, a controller to turn the device on when temperature measured is outside a desired range, a pump to take a portion of the liquid from outside the device to thermal contact with the thermal adjustment element and return the portion of the liquid to outside the device, and a photovoltaic module mounted in a position to be exposed to light which photovoltaic module provides energy to operate the device.

15 Claims, 1 Drawing Sheet

(56) References Cited

U.S. PATENT DOCUMENTS

| | | | |
|---|---|---|---|
| 2009/0204263 A1* | 8/2009 | Love | G05D 23/19 |
| | | | 700/282 |
| 2013/0240025 A1* | 9/2013 | Bersano | H02S 10/40 |
| | | | 136/251 |
| 2014/0353221 A1 | 12/2014 | Biley et al. | |
| 2017/0176061 A1* | 6/2017 | Moran | F25B 21/02 |
| 2018/0209695 A1* | 7/2018 | Adjabeng | F25B 1/005 |
| 2018/0266712 A1* | 9/2018 | Plourde | F24D 17/0063 |
| 2021/0047604 A1* | 2/2021 | Hanks | C12M 33/10 |
| 2022/0033865 A1* | 2/2022 | Ozaki | C12P 7/6463 |

OTHER PUBLICATIONS

Cohen, J. "Kelp Beats the Heat", The UCSB Current, Dec. 13, 2016; 3 pages.

\* cited by examiner

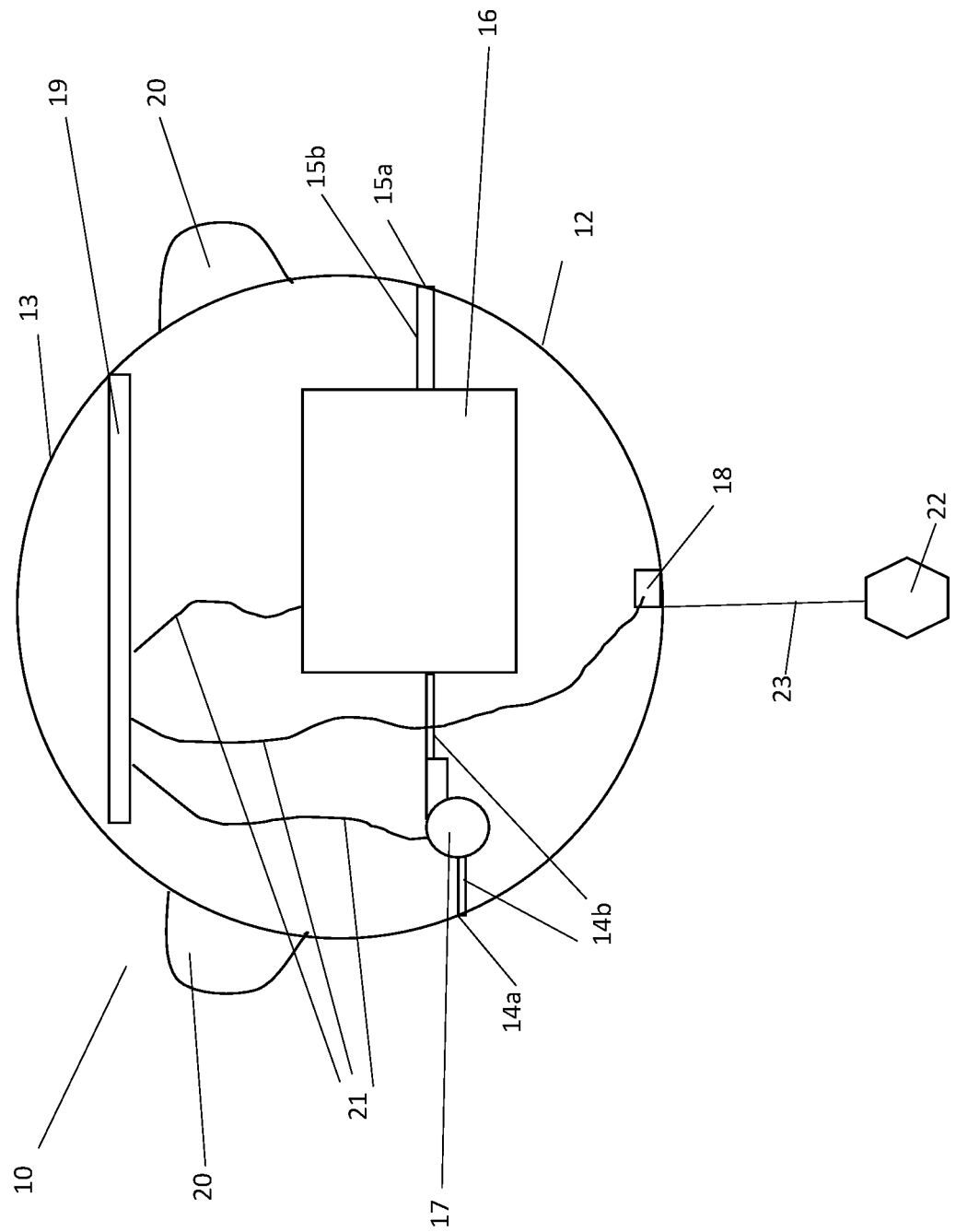

FLOATING SOLAR POWERED LIQUID COOLING DEVICE

BACKGROUND

Aquaculture (or aquafarming) is used to produce food or other products. The growth and health of some of aquatic organisms can be affected by the temperature of the water. Climate changes can cause increases in water temperature that can cause a die off of some of such organisms. For example, giant kelp does best at temperature of 10-16° C. and spikes above that temperature caused loss of kelp forests in Tasmania. A. Bland "As Oceans Warm, the World's Kelp Forests Begin to Disappear" Yale Environment360, Nov. 20, 2017.

Aquaculture proprietors would benefit from a means to adjust water temperature.

SUMMARY OF THE INVENTION

Disclosed herein is a device that can float in a liquid (e.g., water) where the device comprises a thermal adjustment element, a temperature detector placed to measure the temperature of the liquid exterior to the device, a controller to turn the device on when temperature is outside a desired range, a pump to take a portion of the liquid from outside the device to thermal contact with the thermal adjustment element and return the portion of the liquid to outside the device, and a photovoltaic module mounted in a position to be exposed to light and provide energy to operate the device.

Also disclosed is a method comprising placing a floating device in a liquid, where the device comprises a thermal adjustment element and a photovoltaic module, monitoring a temperature of the liquid, comparing the temperature to a desired temperature range, and, when the temperature is outside of the desired temperature range, pumping a portion of the liquid to contact the thermal adjustment element contained in the device, wherein the device is operated from power from the photovoltaic module.

BRIEF DESCRIPTION OF THE DRAWINGS

Referring now to the FIGURES, which are exemplary embodiments, and wherein the like elements are numbered alike.

FIGURE is a schematic showing a cross section of a shell and interior components (not to scale) of an exemplary device within the scope of the invention.

DETAILED DESCRIPTION OF THE INVENTION

Referring to the FIGURE as an example, the device 10 can comprise a shell 12. The shell can have a top surface 13 as shown or can be open on top. There can be openings, such as 14a and 15a, in the shell to enable liquid to (a) enter the device, (b) be in thermal contact with a thermal adjustment element 16, and (c) exit the device. A pump 17 can be used to move the liquid. The pump 17 can be a separate element as shown or can be integral with the thermal adjustment element 16. The liquid can be directed within the device 10 by tubes such as 14b and 15b to flow into or around the thermal adjustment element 16. The tubes can be equipped with valves (not shown) that open when the device is in operation and close when not in operation. The tubes can be flexible (e.g., hoses) or rigid (e.g., pipes). Alternatively, while not shown in the FIGURE, the liquid could fill a lower portion of the interior of the shell 12 around the thermal adjustment element 16. The liquid entering the device 10, for example, at opening 14a will have a different temperature than the liquid exiting the device for example at opening 15a.

The thermal adjustment element 16 can be a heat exchanger, such as, for example a liquid to liquid heat exchanger. The thermal adjustment element 16 can be an electric heater if the intent is to heat the liquid. The thermal adjustment element 16 can comprise a cooling element containing a cold material such as for example dry ice if the intent is to cool the liquid.

The photovoltaic module 19 can provide power to any of the components requiring electrical energy for operation, such as the thermal adjustment element 16, the controller (or thermostat) 18, the pump 17 and/or any valves in the tubes 14b, 15b. Electrical connections 21 can supply the energy from the photovoltaic module to one or more of those components. If desired, a battery (not shown) could be used to store power from the photovoltaic module 19 when the power usage in the device 10 is low.

The temperature detector is placed to measure the temperature of the liquid outside the device 10. As shown in the FIGURE, the thermal detector can be integral with the controller (e.g., as in the shown thermostat 18). If desired to get a temperature of the liquid at a further distance from the shell, the temperature detector can be located outside the exterior surface of the shell 12. The temperature detector would be then connected to the controller 18.

The device could be formed such that is floats by virtue of its shape and weight. However, if needed or to enhance floatation a floatation element 20 can be added. As shown in the FIGURE, the floatation element can be exterior to the shell. However, floatation elements, such as isolated air pockets could instead or in addition be used within the shell.

As shown in the FIGURE, the photovoltaic module 19 can be within the shell 12 and positioned at or near a top transparent surface 13 so as to receive sunlight or other light energy. Alternatively, the photovoltaic module could be located on top of the shell with electrical connections extending into the shell to the electrically powered components (e.g., pump, controller, any electrically operated thermal adjustment element).

The shell can comprise one or more water resistance materials, such as polymers, ceramics, or metals. The shell can be watertight or substantially watertight. In the FIGURE, the shell 12 is shown as a sphere. However, other shapes could be used such as cylinders, buoy-like shapes. For small portable versions of the device, the shell could, for example, comprise a bottom portion and a top portion, where together the portions have at least two openings. For example, the bottom and top portions could be domes that when placed together form a substantially spherical shape. The pump 17, controller 18, tubes 14b, 15b (if any), thermal adjustment element 16, and, optionally, the photovoltaic module 19 can be placed into or on the bottom portion in proper connectivity with each other. For example, the controller 18 should be in communication with the pump 17 and any other active components to be able to turn the device on. The photovoltaic module 19 should be in electrical connectivity with the pump 17 and the controller 18 and with any electrically powered thermal adjustment element 16. The top portion can be placed over the first portion and, is preferably sealed to form a substantially water-tight enclosure (except for intended ingress and egress through the openings). A small device could have a maximum shell dimension of about 1-3 meters. Larger devices could also be made. An open topped shell could benefit from air cooling (fans) to assist the thermal adjustment element. The shell can include thermal insulation (not shown) to assist in maintaining the interior of the shell at a different temperature than the liquid in which the device is floating. In addition, such thermal insulation can protect the tubes and thermal adjustment element from undesirable heating from proximity to the other electrical elements in the device.

The device 10 can include an anchor 22 and/or anchor connection 23 to hold the device in a desired location. For example, an anchor connection 23 can connect to an anchor or a fixed object.

The device 10 as described herein can be used in facilitating temperature control of a liquid in which the device floats. Thus, disclosed here is a method comprising placing a floating device which comprises a thermal adjustment element and a photovoltaic module in a liquid, monitoring a temperature of the liquid, comparing the temperature to a desired temperature range, and, when the temperature is outside of the desired temperature range, pumping a portion of the liquid through the thermal adjustment element contained in the device, wherein the device is operated from power from the photovoltaic module.

The liquid can be water. The liquid can be seawater. The liquid could be a liquid contained in a vessel (tank, pool, etc.) or could be an open body of water such as a lake or pond. For large vessels or open bodies of water it can be desirable to anchor the device to keep it in the desired location. More than one such device can be placed in the liquid if a large volume of liquid is being heated or cooled.

As one example of use the method can comprise placing one or more of the devices in an aquaculture area where biomaterial is being grown to help control the temperature of the water at a desired range useful for growth of that bio-material. For example, for kelp farming, several devices could be placed throughout the kelp farm. When the temperature of the water is measured by the temperature detector to exceed the desired range, the controller can turn on the device pumping the warmer water through the thermal adjustment element to cool the water.

PARTS LIST FOR FIGURE

10 Device
12 Shell
13 Top surface of shell
14*a* and 15*a* openings in shell
14*b* and 15*b* tubes from exterior of shell to thermal adjustment element
16 thermal adjustment element
17 pump
18 thermostat and/or controller
19 photovoltaic module
20 flotation element
21 electrical connections
22 anchor
23 anchor connection This disclosure encompasses the following aspects:

Aspect 1: A device that can float in a liquid where the device comprises a thermal adjustment element, a temperature detector to measure the temperature of the liquid exterior to the device, a controller to turn the device on when temperature measured is outside a desired range, a pump to take a portion of the liquid from outside the device to thermal contact with the thermal adjustment element and return the portion of the liquid to outside the device, and a photovoltaic module mounted in a position to be exposed to light which photovoltaic module provides energy to operate the device.

Aspect 2: The device of Aspect 1 wherein the thermal adjustment element is a liquid to liquid heat exchanger.

Aspect 3: The device of Aspect 1 or 2 wherein the thermal adjustment element is contained within a shell.

Aspect 4: The device of any of the preceding Aspects wherein a floatation element is attached to the shell.

Aspect 5: The device of any of the preceding Aspects wherein the comprises a liquid intake and a liquid output.

Aspect 6: The device of any of the preceding Aspects wherein the liquid intake and the liquid output each comprise a tube extending from exterior of shell to heat exchanger.

Aspect 7: The device of any of the preceding Aspects further comprising a valve on at least one of the tubes which opens when the controller turns on the device.

Aspect 8: The device of any of the preceding Aspects wherein the shell has a transparent top surface and the photovoltaic module is located under such top surface within a water-resistant portion of the shell.

Aspect 9: The device of any of the preceding Aspects wherein the photovoltaic module is located on top of the shell.

Aspect 10: The device of any of the preceding Aspects further comprising an anchor connected to the bottom of the shell.

Aspect 11: A method comprising placing in a liquid a floating device which comprises a thermal adjustment element and a photovoltaic module, monitoring a temperature of the liquid, comparing the temperature to a desired temperature range, when the temperature is outside of the desired temperature range pumping a portion of the liquid to contact the thermal adjustment element contained in the device, wherein the device is operated from power from the photovoltaic module.

Aspect 12: The method of Aspect 11 wherein the photovoltaic module powers the pumping.

Aspect 13: The method of Aspect 11 or 12 wherein the monitoring and comparing occur in a thermostat powered by the photovoltaic module.

Aspect 14: The method any of Aspects 11-13 wherein the liquid is cooled by contact with the thermal adjustment element.

Aspect 15: The method of any of Aspects 11-14 wherein the thermal adjustment element is a heat exchanger through which the liquid is pumped.

Aspect 16: The method of any of Aspects 11-15 wherein the liquid comprises sea water in an aquaculture region.

Aspect 17: The method of any of Aspects 11-16 comprising anchoring the device in a desired location.

Aspect 18: The method of any of Aspects 11-17 wherein kelp is grown in the aquaculture region and the desired temperature range is 10-16° C.

The disclosure may alternately comprise, consist of, or consist essentially of, any appropriate components herein disclosed. The disclosure may additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

What is claimed is:

1. A device that can float in a liquid where the device comprises
a shell comprising a substantially water resistant material, a cooling element contained within the shell, a temperature detector to measure the temperature of the liquid exterior to the shell, a controller contained within the shell to turn the device on when temperature measured is outside a desired range, a pump contained within the shell to take a portion of the liquid from outside the device through a first opening in the shell through a first tube to thermal contact with the cooling element and return the portion of the liquid through a second tube through a second opening in the shell to outside the device, and a photovoltaic module mounted in a position to be exposed to light whereby the photovoltaic module provides electrical energy to operate the pump, the controller, and, optionally, the cooling element.

2. The device of claim 1 wherein the cooling element is a liquid to liquid heat exchanger.

3. The device of claim 1 wherein the shell is spherical.

4. The device of claim 3 wherein a floatation element is attached to the shell.

5. The device of claim 1 further comprising a valve on at least one of the tubes which opens when the controller turns on the device.

6. The device of claim 3 wherein the shell has a transparent top surface and the photovoltaic module is located under such top surface within a water-resistant portion of the shell.

7. The device of claim 3 wherein the photovoltaic module is located on top of the shell.

8. The device of claim 3 further comprising an anchor connected to the bottom of the shell.

9. A method comprising anchoring in a region of a sea where kelp is being grown a floating device which comprises a cooling element and a photovoltaic module, monitoring a temperature of seawater in the region, comparing the temperature to a desired temperature range, when the temperature is higher than the desired temperature range pumping a portion of the seawater to contact the cooling element contained in the device to cool the seawater, wherein the photovoltaic module provides electrical energy for pumping the liquid.

10. The method of claim 9 wherein the monitoring and comparing occur in a thermostat powered by the photovoltaic module.

11. The method of claim 9 wherein the cooling element is a heat exchanger through which the liquid is pumped.

12. The method of claim 9 wherein the desired temperature range is 10-16° C.

13. The method of claim 9 wherein the device comprises a shell comprising a substantially water resistant material, the cooling element being contained within the shell, a temperature detector to monitor the temperature of the seawater exterior to the shell, a pump contained within the shell to take a portion of the liquid from outside the device through a first opening in the shell through a first tube to thermal contact with the cooling element and return the portion of the liquid through a second tube through a second opening in the shell to outside the device, a controller contained within the shell for comparing the temperature and turning on the pump when temperature measured is higher than the desired range, wherein the photovoltaic module is mounted in a position to be exposed to light which whereby the photovoltaic module provides electrical energy to operate the pump, the controller, and, optionally, the cooling element.

14. The device of claim 1 wherein the cooling element comprises dry ice.

15. The method of claim 9 wherein the cooling element comprises dry ice.

* * * * *